(12) United States Patent
Cheng et al.

(10) Patent No.: US 11,061,211 B2
(45) Date of Patent: Jul. 13, 2021

(54) IMAGING SYSTEM AND BIMODAL ZOOM LENS THEREOF

(71) Applicant: OmniVision Technologies, Inc., Santa Clara, CA (US)

(72) Inventors: Tingyu Cheng, New Taipei (TW); Jau-Jan Deng, Taipei (TW)

(73) Assignee: OmniVision Technologies, Inc., Santa Clara, CA (US)

( * ) Notice: Subject to any disclaimer, the term of this patent is extended or adjusted under 35 U.S.C. 154(b) by 126 days.

(21) Appl. No.: 16/243,935

(22) Filed: Jan. 9, 2019

(65) Prior Publication Data

US 2020/0218043 A1 Jul. 9, 2020

(51) Int. Cl.
*G02B 15/177* (2006.01)
*G02B 15/20* (2006.01)
*G02B 23/24* (2006.01)

(52) U.S. Cl.
CPC .......... *G02B 15/177* (2013.01); *G02B 15/20* (2013.01); *G02B 23/2446* (2013.01)

(58) Field of Classification Search
CPC ...... G02B 15/177; G02B 15/14; G02B 15/20; G02B 9/12; G02B 9/18; G02B 9/922; G02B 9/38; G02B 23/2446
USPC ....... 359/684, 689, 716, 748, 753, 784, 787, 359/790
See application file for complete search history.

(56) References Cited

U.S. PATENT DOCUMENTS

| | | | |
|---|---|---|---|
| 6,118,592 A | 9/2000 | Kohno et al. | |
| 8,259,397 B2 * | 9/2012 | Kim | G02B 27/646 359/676 |
| 2005/0231817 A1* | 10/2005 | Matsusaka | G02B 15/177 359/680 |
| 2011/0013071 A1* | 1/2011 | Lin | G02B 15/177 348/345 |

FOREIGN PATENT DOCUMENTS

| | | |
|---|---|---|
| CN | 1611976 A | 5/2005 |
| CN | 203287606 U | 11/2013 |

* cited by examiner

*Primary Examiner* — Jie Lei
(74) *Attorney, Agent, or Firm* — Lathrop GPM LLP

(57) ABSTRACT

A bimodal zoom lens includes three coaxially aligned lenses including a first lens, a third lens, and a second lens therebetween. The first lens is a negative lens, each of the second lens and the third lens is a positive lens. The three coaxially aligned lenses form (i) a first configuration when the second lens and the first lens are separated by an axial distance $L_{11}$ and (ii) a second configuration when the second lens and the first lens are separated by an axial distance $L_{12}$, which exceeds axial distance $L_{11}$. The second configuration has a second effective focal length that exceeds a first effective focal length of the first configuration.

16 Claims, 4 Drawing Sheets

| surface/plane | radius of curvature, mm | thickness, mm small FOV (FIG. 2) | thickness, mm wide FOV (FIG. 3) | refractive index | Abbe number | semi-diameter, mm | conic | 4th-order term | 6th-order term | 8th-order term | 10th-order term | 12th-order term |
|---|---|---|---|---|---|---|---|---|---|---|---|---|
| surface 211 | 0.5434 | 0.2003 | | 1.51 | 57.0 | 0.8863 | -3.5910 | -0.4307 | 0.2421 | 0.0494 | | |
| surface 212 | 0.2087 | 0.1648 | 0.6904 | | | 0.5159 | -1.4945 | 4.1668 | -17.0461 | -10.8834 | 80.9842 | 52.4397 |
| surface 221 | 0.5485 | 0.1156 | | 1.59 | 31.2 | 0.3214 | -4.3784 | 2.5698 | -18.6653 | 24.1953 | 388.8857 | -603.7314 |
| surface 251 | infinity | 0.3050 | | 1.52 | 62.6 | 0.2937 | | | | | | |
| surface 261 | infinity | 0.4000 | | 1.52 | 62.6 | 0.1359 | | | | | | |
| surface 231 | infinity | 0.0933 | | 1.51 | 57.0 | 0.2987 | | | | | | |
| surface 232 | -0.6191 | 0.5715 | 0.0450 | | | 0.3085 | -2.0579 | -1.4728 | 21.1508 | -192.8677 | 1288.0192 | 23.3547 |
| surface 241 | 0.9570 | 0.1287 | | 1.51 | 57.0 | 0.5326 | 1.6036 | -1.4433 | 1.4097 | 4.3970 | -30.1229 | |
| surface 271 | infinity | 0.2000 | | 1.52 | 62.6 | 0.5338 | | | | | | |
| surface 281 | infinity | 0.4000 | | 1.52 | 62.6 | 0.4349 | | | | | | |
| surface 282 | infinity | 0.0045 | | | | 0.4987 | | | | | | |
| image plane 284 | infinity | 0.0000 | | | | 0.5090 | | | | | | |

FIG. 4

| surface/plane | radius of curvature, mm | thickness, mm small FOV (FIG. 2) | thickness, mm wide FOV (FIG. 3) | refractive index | Abbe number | semi-diameter, mm | conic | 4th-order term | 6th-order term | 8th-order term | 10th-order term | 12th-order term |
|---|---|---|---|---|---|---|---|---|---|---|---|---|
| surface 211 | 0.4929 | 0.2003 | | 1.51 | 57.0 | 0.8892 | -2.9949 | -0.7598 | 0.8264 | -0.2675 | | |
| surface 212 | 0.2035 | 0.1689 | 0.6934 | | | 0.5228 | -1.4945 | 3.9964 | -24.6258 | 48.5599 | -31.6136 | 52.4397 |
| surface 221 | 0.5474 | 0.1130 | | 1.59 | 31.2 | 0.3219 | -5.3256 | 3.3118 | -22.0967 | 20.8309 | 447.3892 | -603.7314 |
| surface 251 | infinity | 0.3050 | | 1.52 | 62.6 | 0.3096 | | | | | | |
| surface 261 | infinity | 0.4000 | | 1.52 | 62.6 | 0.1376 | | | | | | |
| surface 231 | infinity | 0.0892 | | 1.51 | 57.0 | 0.2987 | | | | | | |
| surface 232 | -0.6594 | 0.5761 | 0.0450 | | | 0.3084 | -1.7320 | -1.0835 | 14.4944 | -127.8406 | 1037.2479 | |
| surface 241 | 0.9286 | 0.1286 | | 1.51 | 57.0 | 0.5299 | 1.3213 | -1.4814 | 2.9176 | -6.3225 | -8.5487 | 23.3547 |
| surface 271 | infinity | 0.2000 | | 1.52 | 62.6 | 0.5313 | | | | | | |
| surface 281 | infinity | 0.4000 | | 1.52 | 62.6 | 0.4330 | | | | | | |
| surface 282 | infinity | 0.0450 | | | | 0.5010 | | | | | | |
| image plane 284 | infinity | 0.0000 | | | | 0.5105 | | | | | | |

FIG. 5

| | configuration | | | |
|---|---|---|---|---|
| | 400A | 500A | 400B | 500B |
| maximum longitudinal aberration / μm [maximum entrance pupil radius / μm] | 450 [125] | 450 [131] | 250 [86.7] | 270 [93.4] |
| maximum lateral color / μm | 4.0 | 3.5 | 9.0 | 8.0 |
| maximum distortion (percent) | 5 | 4 | 2 | 6 |
| field curvature range / μm | −80 to +10 | −80 to +30 | −50 to +30 | −50 to +25 |

FIG. 6

IMAGING SYSTEM AND BIMODAL ZOOM LENS THEREOF

BACKGROUND

Cameras with optical zoom functionality include a zoom-lens imaging system. In a zoom-lens imaging system, the system's magnification may be varied by adjusting a zoom lens thereof, thereby allowing flexibility in imaging a scene. For example, if a close-up view of a portion of the scene is desired, the magnification may be set to a large value, thereby devoting the full resolution of the imaging system's image sensor to the small scene portion. On the other hand, if an image of the entire scene is desired, the magnification may be set to a small value, thereby allowing the imaging system to capture the entire scene.

A drawback of conventional zoom-lens imaging systems is that adjusting the zoom lens changes the axial length of the imaging system. This is particularly undesirable when the imaging system is part of a compact camera module such as those employed in portable devices such as mobile phones and tablets.

SUMMARY OF THE EMBODIMENTS

Embodiments disclosed herein present a zoom lens configured to operate in two imaging modes: one with a narrow field of view and one with a wide field of view, without changing the total track length of the imaging system.

In a first embodiment, a bimodal zoom lens includes three coaxially aligned lenses including a first lens, a third lens, and a second lens therebetween. The first lens is a negative lens, each of the second lens and the third lens is a positive lens. The three coaxially aligned lenses form (i) a first configuration when the second lens and the first lens are separated by an axial distance $L_{11}$ and (ii) a second configuration when the second lens and the first lens are separated by an axial distance $L_{12}$, which exceeds axial distance $L_{11}$. The second configuration has a second effective focal length that exceeds a first effective focal length of the first configuration.

In a second embodiment, an imaging system includes an image sensor and the bimodal zoom lens, of the first embodiment, configured to form an image on a pixel array of the image sensor.

BRIEF DESCRIPTION OF THE FIGURES

FIG. 4 and FIG. 5 show, respectively, a first table and a second table of exemplary parameters of the bimodal zoom lens of FIGS. 2 and 3.

FIG. 6 is a table showing lens performance metrics of embodiments of the bimodal zoom lenses characterized by the parameters of FIGS. 4 and 5.

DETAILED DESCRIPTION OF THE EMBODIMENTS

Figure 1:
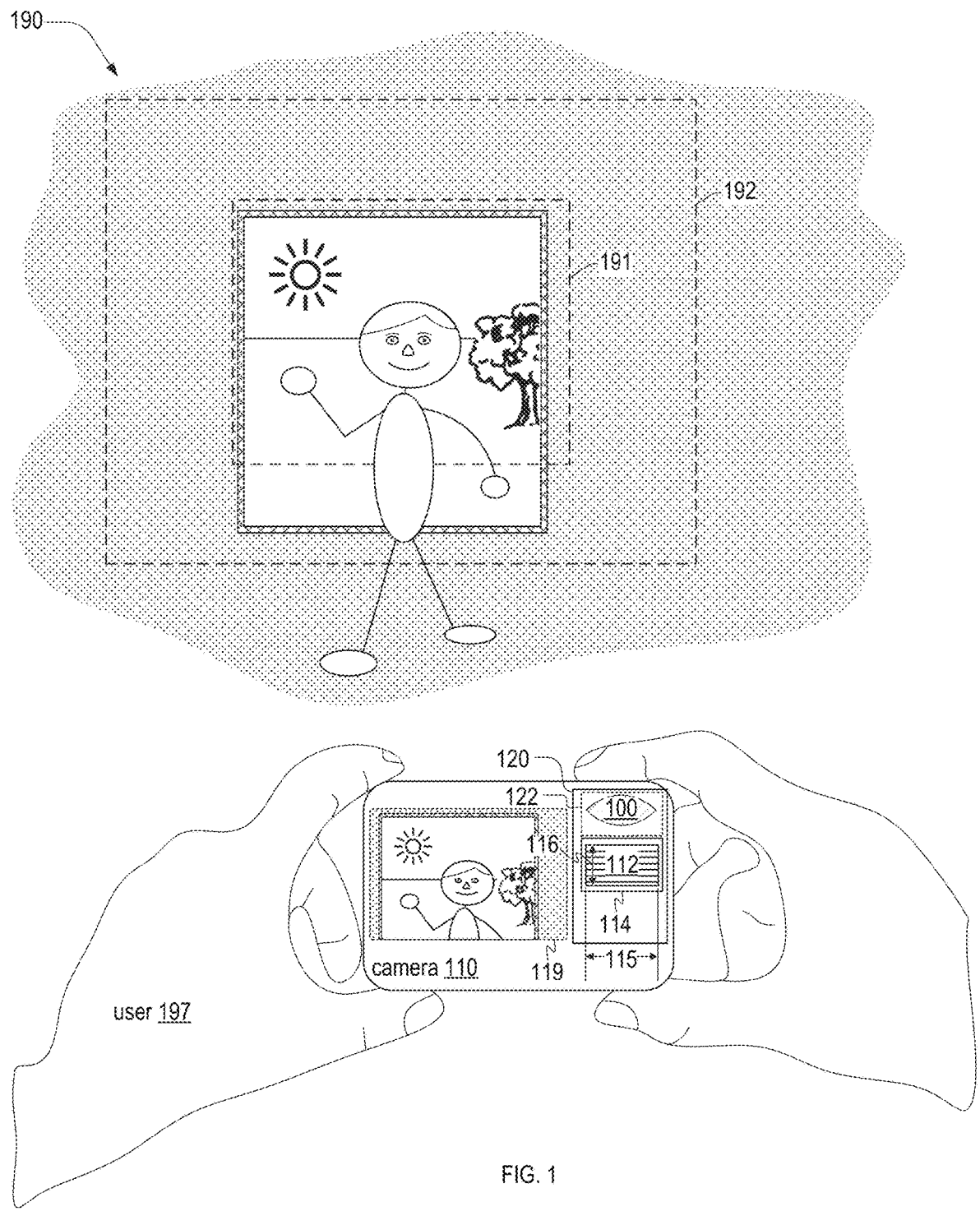
FIG. 1 is a schematic illustration of a camera that includes a bimodal zoom lens, in an embodiment.

FIG. 1 is a schematic illustration of a user 197 directing a camera 110 to image a scene 190. Camera 110 includes a bimodal zoom lens 100 aligned to a pixel array 112 of an image sensor 114. Bimodal zoom lens 100 and pixel array 112 form an imaging system 120, where pixel array 112 may be located at an image plane of bimodal zoom lens 100. (For clarity of illustration, pixel array 112 and bimodal zoom lens 110 are depicted vertically offset from each other in FIG. 1.) Bimodal zoom lens 100 may be mounted to image sensor 114 by a lens housing 122, which may also support and position multiple lens elements constituting bimodal zoom lens 100. Image sensor 114 may be communicatively coupled to a display 119, which may be part of camera 110.

Pixel array 112 has a width 115 and a height 116, at least one of which may be less than or equal to 1.1 millimeters. Width 115 may be between 770 µm and 870 µm and height 116 may be between 575 µm and 675 µm. In an embodiment, width 115 and height 116 are 820±10 µm and 625±10 µm, respectively. Image sensors with such small pixel arrays are useful for imaging applications where compactness of camera 110 is important. For example, either one of imaging system 120 and camera 110 may be part of a medical device, a mobile device, or a motor vehicle. Medical devices include endoscopes, examples of which include cystoscopes, nephroscopes, bronchoscopes, arthroscopes, colonoscopes, esophagogastroduodenoscopes, and laparoscopes.

Bimodal zoom lens 100 has a first and second imaging configuration (or imaging modes), each of which results in imaging scene 190 onto pixel array 112. In the first imaging configuration, imaging system 120 has a first field of view that corresponds to a first region 191 of scene 190. In the second imaging configuration, imaging system 120 has a second field of view that corresponds to a second region 192 of scene 190. Second region 192 is larger than first region 191.

Figure 2:
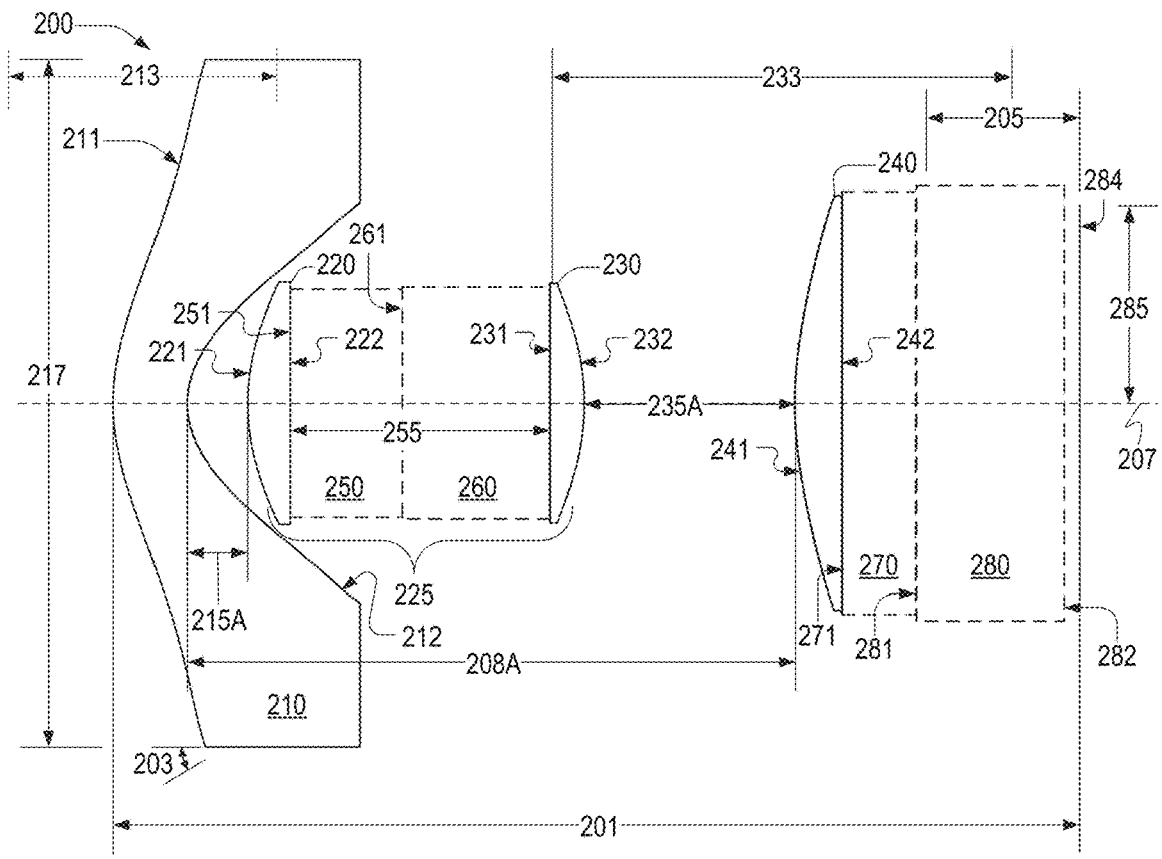
FIG. 2 is a schematic cross-sectional illustration of a bimodal zoom lens in a first imaging configuration, the bimodal zoom lens being an embodiment of the bimodal zoom lens of FIG. 1.
Figure 3:
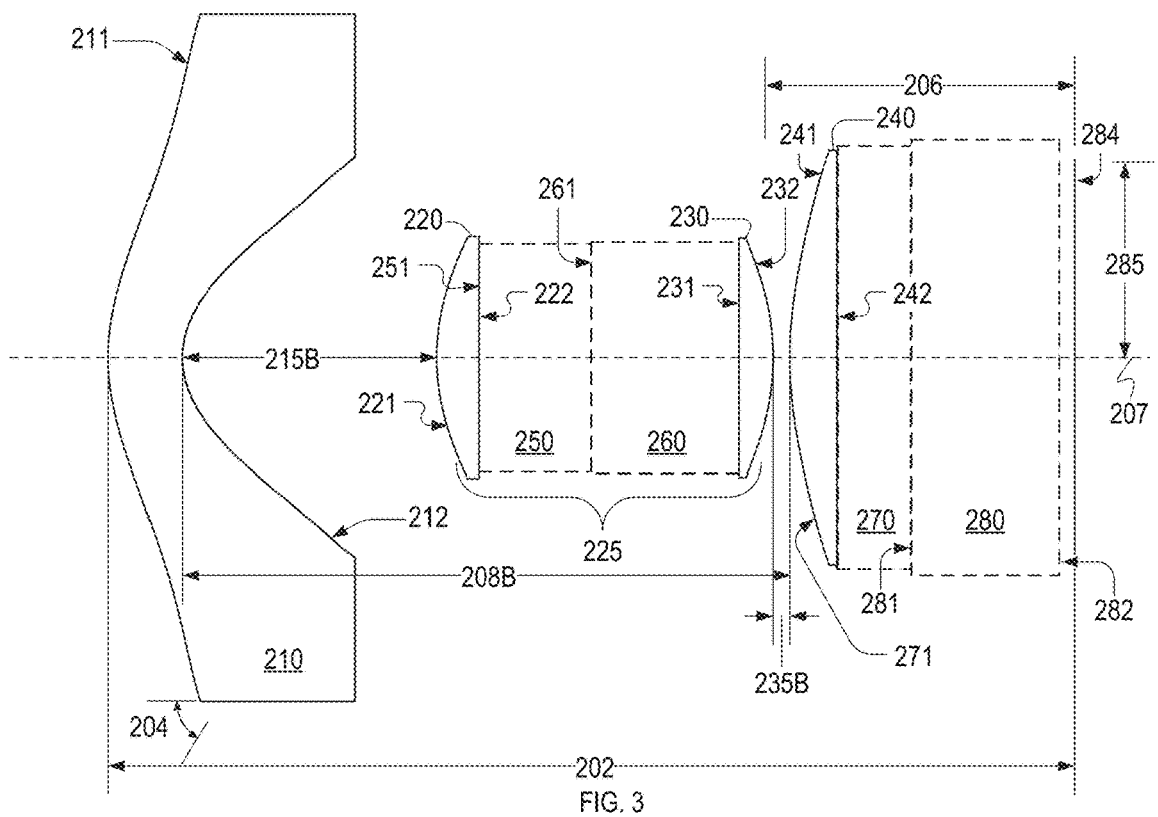
FIG. 3 is a schematic cross-sectional illustration of the bimodal zoom lens of FIG. 2 in a second imaging configuration.

FIG. 2 is a schematic cross-sectional illustration of a bimodal zoom lens 200 in a first imaging configuration. FIG. 3 is a schematic cross-sectional illustration of a bimodal zoom lens 200 in a second imaging configuration. Bimodal zoom lens 200 is an example of bimodal zoom lens 100. The first and second imaging configurations of bimodal zoom lens 200 are examples of, respectively, the first imaging configuration, which images scene region 191, and second imaging configuration, which images scene region 192, of bimodal zoom lens 100, FIG. 1. FIGS. 2 and 3 are best viewed together in the following description.

Bimodal zoom lens 200 includes lenses 210, 220, 230, and 240. Lenses 210, 220, 230, and 240 have a common optical axis 207 such that they are coaxially aligned. Bimodal zoom lens 200 may also include at least one of substrates 250, 260, 270, and 280. The aperture stop of bimodal zoom lens 200 may be either between substrates 250 and 260 or between substrates 270 and 280. Substrate 280 may be a cover glass that covers pixel array 112, and may be part of image sensor 114.

Lenses 210-240 have respective object-side surfaces 211, 221, 231, and 241 and respective image-side surfaces 212, 222, 232, and 242. The shape of surface 241 may be configured to reduce field curvature of images formed by bimodal zoom lens 200. Substrates 250-280 have respective planar object-side surfaces 251, 261, 271, and 281. Substrate 280 has an image-side surface 282. FIGS. 2 and 3 show an image plane 284 upon which bimodal zoom lens 200 forms an image in both its first configuration and its second configuration. When bimodal zoom lens 200 is implemented in imaging system 120, FIG. 1, pixel array 112 may be located at image plane 284.

Lens 210 is a negative lens. Lenses 220, 230, and 240 are each positive lenses. Lenses 220 and 230 are separated by a fixed axial distance 255 along optical axis 209. In embodiments of bimodal zoom lens 200 that include substrates 250 and 260, fixed axial distance 255 is, for example, the sum of axial thicknesses of substrates 250 and 260. Lens 210 has a diameter 217, which may be less than two millimeters to enable sufficient compactness of bimodal zoom lens 200, and hence also camera 110.

While FIGS. 2 and 3 illustrate lenses 220 and 230 as distinct lenses, lenses 220 and 230 may form a biconvex lens 225, which may be a monolithic lens or a compound lens. Biconvex lens 225 may include at least one of substrates 250 and 260. Substrates 250 and 260 may be a single monolithic substrate having an axial thickness equal to fixed axial distance 255.

In the lens configuration of FIG. 2, lens 210 and lens 220 are separated by an axial distance 215A, and lens 230 and lens 240 are separated by an axial distance 235A. In the lens configuration of FIG. 3, lens 210 and lens 220 are separated by an axial distance 215B, and lens 230 and lens 240 are separated by an axial distance 235B. Axial distance 215B exceeds axial distance 215A; axial distance 235A exceeds axial distance 235B. Bimodal zoom lens 200 is in its first configuration, or "narrow configuration," when lenses 210 and 220 are separated by axial distance 215A, and in its second configuration, or "wide configuration," when lenses 210 and 220 are separated by axial distance 215B.

The first configuration, FIG. 2, has a total track length 201, a field of view 203, and an effective focal length 205. The second configuration, FIG. 3, has a total track length 202, a field of view 204, and an effective focal length 206. Total track lengths 201 and 202 may be approximately equal, which enables bimodal zoom lens 200 to change between its two configurations with minimal effect, or no effect, on the location of lens 200 with respect to nearby hardware components, such as image sensor 114 and lens housing 122. For example, the ratio of total track length 201 to total track length 202 is between 0.9925 and 1.0075.

In one implementation of bimodal zoom lens 200, the positions of lenses 210 and 240 are fixed relative to each other, while the position of lenses 220 and 230 may be adjusted axially without affecting fixed axial distance 255. Total track length 201 may be less than three millimeters to enable sufficient compactness of imaging system 220, and hence also camera 110.

Bimodal zoom lens 200 may be configured such that lenses 220 and 230 move together along optical axis 207, between the narrow configuration of FIG. 2 and the wide configuration of FIG. 3. For example, camera 110 may include a linear actuator configured to move lenses 220 and 230, as biconvex lens 225 for example, between the narrow and wide configurations.

Lenses 210 and 240 are separated by respective axial distances 208A and 208B in the lens configurations of FIG. 2 and FIG. 3, respectively. Axial distances 208A and 208B are between surfaces 212 and 241, and may be equal. Lens housing 122 may constrain each of axial distances 208A and 208B to be fixed distances such that distances 208A and 208B are equal.

While lens 210 partly determines fields of view 203 and 204, axial distances 215A and 215B also play a role, such that field of view 204 may exceed field of view 203 given a constant maximum image height 285 at image plane 284. Image height 285 is, for example, between 0.49 millimeters and 0.52 millimeters. Effective focal length 205 may exceed effective focal length 206. For example, a ratio of effective focal length 205 to effective focal length 206 may exceed 1.99.

Lenses 210 and 230 have respective focal lengths 213 and 233. The ratio of focal length 213 to effective focal length 205 may be between −1.02 and zero. The ratio of focal length 233 to effective focal length 205 may be between zero and 1.54. Each of these constraints contribute to maintaining a desired magnification ratio between the narrow and wide configurations. For example, when an 1/18" VGA image sensor determines image height 285 at image plane 284, satisfaction of both aforementioned ratios of focal length 213 and 233 relative to effective focal length 205 ensures that the magnification of the narrow configuration is twice that of the wide configuration, such that bimodal zoom lens 200 functions as a 2× optical zoom lens.

Lens 210 and lens 240 may include at least one material selected from the group of materials including, but not limited to Schott K10 glass and Arton D4532. Lens 220 may be formed of a material that has an Abbe number $V_D<35$, which facilitates sufficient achromaticity of bimodal zoom lens 200. For example, lens 220 may include at least one material selected from the group of materials including, but not limited to: a polycarbonate such as PANLITE® by Teijin Limited, an optical polyester such as OKP-4 by Osaka Gas Chemicals Co., and an optical glass such as S-FTM 16 by Ohara Corporation.

Substrates 250-280 may be formed of the same material, which may differ from materials comprising at least one of lenses 220, 230, and 240. At least one of substrates 250-280 may be formed of a photoresist, such as one formed of an epoxy resin, of which SU-8 is an example. Such substrate materials are advantageous for wafer-level manufacturing of lens assemblies, e.g., lenses 220, 230, and 240, and substrates thereof.

FIG. 4 depicts a table 400 of exemplary parameters of surfaces and substrates of a first embodiment of bimodal zoom lens 200. Table 400 includes columns 404, 406, 408, 410, 412, and 421-427. Column 421 denotes surfaces of bimodal zoom lens 200.

Column 423 includes thickness values between adjacent surfaces of bimodal zoom lens 200 on optical axis 207. For example, the axial distance between surfaces 212 and 221 is 0.2003 millimeters, which is the axial thickness of lens 210 in this example. Column 426 indicates the minimum diameter of each surface sufficient for a ray incident on surface 211, and passing through lens 200's aperture stop, to also pass through that surface.

Non-planar surfaces of table 400 are defined by surface sag $z_{sag}$, shown in Eqn. 1.

$$z_{sag} = \frac{R^{-1}r^2}{1 + \sqrt{1 - (1+k)R^{-2}r^2}} + \sum_{i=2}^{N} \alpha_{2i} r^{2i} \quad (1)$$

In Eqn. 1, $z_{sag}$ is a function of radial coordinate r, where directions z and r are, respectively, parallel to and perpendicular to, optical axis 207. Quantity i is a positive integer and N=6. In Eqn. 1, the parameter R is the surface radius of curvature, listed in column 422 of table 400. Parameter k denotes the conic constant, shown in column 427. Columns 404, 406, 408, 410, and 412 contain values of aspheric coefficients $\alpha_4$, $\alpha_6$, $\alpha_8$, $\alpha_{10}$, and $\alpha_{12}$ respectively. The units of quantities in table 400 are consistent with $z_{sag}$ in Eqn. 1 being expressed in millimeters.

Column 424 lists values of material refractive index at free-space wavelength $\lambda_d$=587.6 nm. Column 425 lists values of the material Abbe number $V_d$. The refractive index and Abbe number corresponding to a surface characterizes the material between the surface and the surface in the row beneath. For example, the refractive index associated with surface 211 is 1.51, which is the refractive index of lens 210 in this embodiment. Similarly, the Abbe number associated with surface 221 is 57.0, which is the Abbe number of lens 220 in this embodiment.

Table 400 indicates two thicknesses in table rows corresponding to surfaces 212 and 232. Thicknesses 0.1648 mm and 0.5715 mm are examples of, respectively, axial distances 215A and 235A of FIG. 2, hereinafter "narrow configuration 400A." Thicknesses 0.6904 mm and 0.0450 mm are examples of, respectively, axial distances 215B and 235B of FIG. 3, hereinafter "wide field-of-view configuration 400B." When bimodal zoom lens 200 has narrow configuration 400A, its field-of view FOV, working f-number N, effective focal length, and total track length TTL are, respectively: FOV=58°, N=3.42, $f_{\mathit{eff}}^A$=0.840, and $TTL_A$=2.624 mm. When bimodal zoom lens 200 has wide field-of-view configuration 400B, its field-of view FOV, working f-number N, effective focal length, and total track length TTL are, respectively: FOV=100°, N=2.38, $f_{\mathit{eff}}^B$=0.416, and $TTL_B$=2.623 mm. The ratio of $f_{\mathit{eff}}^A$ to $f_{\mathit{eff}}^B$ is 2.02.

In the embodiment of bimodal lens 200 corresponding to table 400, the focal lengths of lens 210 and lens 230 are, per the lensmaker's equation, $f_{210}$=−0.833 mm and $f_{230}$=1.212 mm respectively. The ratio of $f_{210}$ to $f_{\mathit{eff}}^A$ equals −0.992. The ratio of $f_{230}$ to $f_{\mathit{eff}}^A$ equals 1.443.

In wide field-of-view configuration 400B, bimodal zoom lens 200 maintains a through-focus modulation transfer function that exceeds 0.25 in a 0.04-mm long range on optical axis 207. The ratio of total track lengths $TTL_A$ and $TTL_B$ is 0.9996, and hence is between 0.9925 and 1.0075, which insures that the aforementioned 0.04-mm long range includes image plane 284.

FIG. 5 depicts a table 500 of exemplary parameters of surfaces and substrates of a second embodiment of bimodal zoom lens 200. Table 500 includes columns 504, 506, 508, 510, 512, and 521-527. Column 521 denotes surfaces of bimodal zoom lens 200.

Column 523 includes thickness values between adjacent surfaces of bimodal zoom lens 200 on optical axis 207. For example, the axial distance between surfaces 212 and 221 is 0.2003 millimeters, which is the axial thickness of lens 210 in this example. Column 526 indicates the minimum diameter of each surface sufficient for a ray incident on surface 211, and passing through lens 200's aperture stop, to also pass through that surface.

Non-planar surfaces of table 500 are defined by surface sag $z_{sag}$, shown in Eqn. 1. Columns 522 and 523 list values of radius of curvature R and conic constant k, respectively. Columns 504, 506, 508, 510, and 512 contain values of aspheric coefficients $\alpha_4$, $\alpha_6$, $\alpha_8$, $\alpha_{10}$, and $\alpha_{12}$ respectively. The units of quantities in table 500 are consistent with $z_{sag}$ in Eqn. 1 being expressed in millimeters.

Column 524 lists values of material refractive index at free-space wavelength $\lambda_d$=587.6 nm. Column 525 lists values of the material Abbe number $V_d$. As in table 400, the refractive index and Abbe number corresponding to a surface characterizes the material between the surface and the surface in the row beneath. The Abbe number associated with surface 221 is 57.0, which is the Abbe number of lens 220 in this embodiment.

Table 500 indicates two thicknesses in table rows corresponding to surfaces 212 and 232. Thicknesses 0.1689 mm and 0.5761 mm are examples of, respectively, axial distances 215A and 235A of FIG. 2, hereinafter "narrow configuration 500A." Thicknesses 0.6934 mm and 0.0450 mm are examples of, respectively, axial distances 215B and 235B of FIG. 3, hereinafter "wide field-of-view configuration 500B." When bimodal zoom lens 200 has narrow configuration 500A, its field-of view FOV, working f-number N, effective focal length, and total track length TTL are, respectively: FOV=56°, N=3.42, $f_{\mathit{eff}}^A$=0.877, and TTL=2.624 mm. When bimodal zoom lens 200 has wide field-of-view configuration 500B, its field-of view FOV, working f-number N, effective focal length, and total track length TTL are, respectively: FOV=99°, N=2.38, $f_{\mathit{eff}}^B$=0.437, and TTL=2.620 mm. The ratio of $f_{\mathit{eff}}^A$ to $f_{\mathit{eff}}^B$ is 2.007.

In the embodiment of bimodal zoom lens 200 corresponding to table 500, the focal lengths of lens 210 and lens 230 are, per the lensmaker's equation, $f_{210}$=−0.887 mm and $f_{230}$=1.290 mm respectively. The ratio of $f_{210}$ to $f_{\mathit{eff}}^A$ equals −1.01. The ratio of $f_{230}$ to $f_{\mathit{eff}}^A$ equals 1.471.

FIG. 6 is a table 600 showing lens performance metrics of the embodiments of bimodal zoom lens 200 corresponding to table 400 and table 500. Tables 400 and 500 include configurations 400A and 500A, which are examples of the narrow configuration illustrated in FIG. 2. Tables 400 and 500 include configurations 400B and 500B, which are examples of the wide configuration illustrated in FIG. 3. The performance metrics of FIG. 6 include longitudinal aberration, lateral color, distortion, and field curvature as computed for free-space wavelengths ranging from 425 nm to 640 nm. Longitudinal aberration was computed for entrance pupil radius values between zero and a maximum value tabulated in a row 602 of table 600. Lateral color was computed at field heights between zero and 0.4950 mm. Distortion and field curvature were computed at field angles between zero and a maximum field angle, which was 29.4 degrees for configurations 400A and 500A, and 50.1 degrees for configurations 400B and 500B.

Combinations of Features

Features described above as well as those claimed below may be combined in various ways without departing from the scope hereof. The following enumerated examples illustrate some possible, non-limiting combinations:

(A1) A bimodal zoom lens includes three coaxially aligned lenses including a first lens, a third lens, and a second lens therebetween. The first lens is a negative lens, each of the second lens and the third lens is a positive lens. The three coaxially aligned lenses form (i) a first configuration when the second lens and the first lens are separated by an axial distance $L_{11}$ and (ii) a second configuration when the second lens and the first lens are separated by an axial distance $L_{12}$, which exceeds axial distance $L_{11}$. The second configuration has a second effective focal length that exceeds a first effective focal length of the first configuration.

(A2) In the bimodal zoom lens (A1), in the first configuration, the second lens and the third lens may be separated by an axial distance $L_{31}$ that exceeds the axial distance $L_{11}$ between the second lens and the first lens. Also in the bimodal zoom lens (A1), in the second configuration, the second lens and the third lens may be separated by an axial distance $L_{32}$ that is less than the axial distance $L_{12}$ between the second lens and the first lens.

(A3) In any of the bimodal zoom lenses (A1)-(A2), the first configuration may have a total track length $T_1$ and the second configuration may have a total track length $T_2$, wherein $0.9925 < T_1/T_2 < 1.0075$.

(A4) In any of the bimodal zoom lenses (A1)-(A3), the second configuration may have a second field of view that exceeds a first field of view of the first configuration.

(A5) In any of the bimodal zoom lenses (A1)-(A4), the ratio of the first effective focal length to the second effective focal length may exceed 1.99.

(A6) In any of the bimodal zoom lenses (A1)-(A5), the ratio of a first focal length, of the first lens, the first effective focal length being between −1.02 and zero.

(A7) In any of the bimodal zoom lenses (A1)-(A6), the second lens may include an object-side positive lens and, at a fixed axial distance therefrom, an image-side positive lens located between the third lens and the object-side positive lens.

(A8) Any bimodal zoom lens (A7) may also include a substrate between the object-side positive lens and the image-side positive lens.

(A9) In the bimodal zoom lens (A8), the substrate may be formed of a substrate material that differs from a second-lens material forming the second lens and a third-lens material forming the third lens.

(A10) In any of the bimodal zoom lenses (A7)-(A9), the ratio of a focal length, of the image-side positive lens, to the first effective focal length may be positive and less than 1.54.

(A11) In any of the bimodal zoom lenses (A7)-(A10), the object-side positive lens may be formed of a material having an Abbe number less than thirty-five.

(A12) In any of the bimodal zoom lenses (A1)-(A11), the first lens and the third lens may be separated by a fixed axial distance, which is invariant between the first configuration and the second configuration.

(B1) An imaging system includes an image sensor and one of bimodal zoom lenses (A1)-(A12) configured to form an image on a pixel array of the image sensor.

(B2) In any imaging system (B1), in which the image sensor includes a pixel array having a width and a height in a plane perpendicular to an optical axis common to the three coaxially aligned lenses, and at least one of the width and the height may be less than 1.1 millimeters.

(B3) Any of the imaging systems (B1) and (B2) may be part of an endoscope.

(B4) In any of the imaging systems (B1)-(B3), the second configuration may have a second field of view that exceeds a first field of view of the first configuration.

Changes may be made in the above methods and systems without departing from the scope hereof. It should thus be noted that the matter contained in the above description or shown in the accompanying drawings should be interpreted as illustrative and not in a limiting sense. Herein, and unless otherwise indicated, the adjective "exemplary" means serving as an example, instance, or illustration. The following claims are intended to cover all generic and specific features described herein, as well as all statements of the scope of the present method and system, which, as a matter of language, might be said to fall therebetween.

What is claimed is:

1. A bimodal zoom lens comprising:
    three coaxially aligned lenses including a first lens, a third lens, and a second lens therebetween,
        the first lens being a negative simple lens, each of the second lens and the third lens being a positive lens,
        the second lens being a multi-element lens that includes an object-side plano-convex positive lens and, at a fixed axial distance therefrom, an image-side plano-convex positive lens located between the third lens and the object-side plano-convex positive lens; and
        a substrate between the object-side plano-convex positive lens and the image-side plano-convex positive lens and including a planar object-side surface and a planar image-side surface, the object-side plano-convex positive lens being disposed on the planar object-side surface, the image-side plano-convex positive lens being disposed on the planar image-side surface;
    the three coaxially aligned lenses being configurable in (i) a first configuration when the second lens and the first lens are separated by an axial distance $L_{11}$ and (ii) a second configuration when the second lens and the first lens are separated by an axial distance $L_{12}$, which exceeds axial distance $L_{11}$,
    the first configuration having a first effective focal length that exceeds a second effective focal length of the second configuration.

2. The bimodal zoom lens of claim 1,
    in the first configuration, the second lens and the third lens being separated by an axial distance $L_{31}$ that exceeds the axial distance $L_{11}$ between the second lens and the first lens;
    in the second configuration, the second lens and the third lens being separated by an axial distance $L_{32}$ that is less than the axial distance $L_{12}$ between the second lens and the first lens.

3. The bimodal zoom lens of claim 1, the first configuration having a total track length $T_1$, the second configuration having a total track length $T_2$, wherein $0.9925 < T_1/T_2 < 1.0075$.

4. The bimodal zoom lens of claim 1, the second configuration having a second field of view that exceeds a first field of view of the first configuration.

5. The bimodal zoom lens of claim 1, ratio of the first effective focal length to the second effective focal length exceeding 1.99.

6. The bimodal zoom lens of claim 1, ratio of a first focal length, of the first lens, the first effective focal length being between −1.02 and zero.

7. The bimodal zoom lens of claim 1, further comprising a substrate between the object-side plano-convex positive lens and the image-side plano-convex positive lens.

8. The bimodal zoom lens of claim 7, the substrate being formed of a substrate material that differs from a second-lens material forming the second lens and a third-lens material forming the third lens.

9. The bimodal zoom lens of claim 1, ratio of a focal length, of the image-side plano-convex positive lens, to the first effective focal length being positive and less than 1.54.

10. The bimodal zoom lens of claim 1, the object-side plano-convex positive lens being formed of a material having an Abbe number less than thirty-five.

11. The bimodal zoom lens of claim 1, the first lens and the third lens being separated by a fixed axial distance, which is invariant between the first configuration and the second configuration.

12. An imaging system comprising:
    an image sensor; and
    the bimodal zoom lens of claim 1, configured to form an image on a pixel array of the image sensor.

13. The imaging system of claim 12, the image sensor including a pixel array having a width and a height in a plane perpendicular to an optical axis common to the three coaxially aligned lenses, at least one of the width and the height being less than 1.1 millimeters.

14. The imaging system of claim 12, wherein the imaging system is part of an endoscope.

15. The imaging system of claim 12, the second configuration having a second field of view that exceeds a first field of view of the first configuration.

16. The bimodal zoom lens of claim 1, the first lens including a single object-side surface and a single image-side surface.

\* \* \* \* \*